(12) United States Patent
Ilan

(10) Patent No.: US 7,821,442 B2
(45) Date of Patent: Oct. 26, 2010

(54) SYSTEM AND METHOD OF ANALYZING RADAR INFORMATION

(75) Inventor: Jacob Ilan, Alon-HaGalil (IL)

(73) Assignee: Israel Aerospace Industries, Ltd., Lod (IL)

( * ) Notice: Subject to any disclaimer, the term of this patent is extended or adjusted under 35 U.S.C. 154(b) by 318 days.

(21) Appl. No.: 12/096,992

(22) PCT Filed: Dec. 14, 2006

(86) PCT No.: PCT/IL2006/001439

§ 371 (c)(1),
(2), (4) Date: Jun. 11, 2008

(87) PCT Pub. No.: WO2007/069253

PCT Pub. Date: Jun. 21, 2007

(65) Prior Publication Data

US 2009/0009378 A1  Jan. 8, 2009

(30) Foreign Application Priority Data

Dec. 15, 2005  (IL) .................................. 172591

(51) Int. Cl.
*G01S 7/40* (2006.01)

(52) U.S. Cl. .................. 342/13; 342/165; 342/169; 342/170; 342/171; 434/2

(58) Field of Classification Search ............ 342/13, 342/165, 169–173; 434/2–5

See application file for complete search history.

(56) References Cited

U.S. PATENT DOCUMENTS

| 4,159,478 | A | * | 6/1979 | Jaklitsch et al. ............... 342/15 |
| 4,454,513 | A | * | 6/1984 | Russell ...................... 342/174 |
| 5,457,460 | A |   | 10/1995 | Tran et al. |
| 5,467,274 | A |   | 11/1995 | Vax |
| 5,587,904 | A |   | 12/1996 | Ben-Yair et al. |
| 6,167,239 | A |   | 12/2000 | Wright et al. |
| 7,257,048 | B1 | * | 8/2007 | Potter et al. .................... 367/1 |

(Continued)

FOREIGN PATENT DOCUMENTS

GB          2 213 339 A          8/1989

(Continued)

OTHER PUBLICATIONS

Singh et al., "Simulation and optimization of the intensity profile of an optical transmitter for high-speed wireless local area networks," *Proc. Photonics-2004*, Cochin, India, Dec. 9-11, 2004.

(Continued)

*Primary Examiner*—John B Sotomayor
(74) *Attorney, Agent, or Firm*—Oliff & Berridge, PLC

(57) ABSTRACT

The present invention provides a method and system of analyzing radar information of a radar system. According to certain embodiments of the invention, the method comprises: providing radar information including at least a portion modified in response to an EWE (electronic-warfare) action; obtaining position data corresponding to at least a position of a target associated with the EW action with respect to the radar system; and analyzing the radar information for comparing it with the position data, thereby allowing to determine at least one effect of the EW action on the radar information.

37 Claims, 5 Drawing Sheets

U.S. PATENT DOCUMENTS

2003/0020992 A1 1/2003 Child
2009/0009378 A1* 1/2009 Ilan .............................. 342/13

FOREIGN PATENT DOCUMENTS

| KR | 2001 066 599 A | 7/2001 |
| KR | 10-0418353 B1 | 1/2004 |
| WO | WO 94/02795 A1 | 2/1994 |

OTHER PUBLICATIONS

Kahn et al., "Imaging Diversity Receivers for High-Speed Infrared Wireless Communication," *IEEE Communications Magazine*, vol. 36, No. 12, Dec. 1998, pp. 88-94.

Djahani et al., "Analysis of Infrared Wireless Links Employing Multibeam Transmitters and Imaging Diversity Receivers," *IEEE Transactions on Communications*, vol. 48, No. 12, Dec. 2000, pp. 2077-2088.

Kahn, "Secure Free-Space Optical Communication Between Moving Platforms," *Proc. of IEEE Lasers and Electro-Optics Society Annual Meeting*, Glasgow, Scotland, Nov. 10-14, 2002.

* cited by examiner

SYSTEM AND METHOD OF ANALYZING RADAR INFORMATION

FIELD OF THE INVENTION

This invention relates to processing of radar information in connection with a real or simulated EW (Electronic Warfare) action.

BACKGROUND OF THE INVENTION

In modern warfare, various combat platforms, such as aircraft, anti-aircraft systems, and battleships, for example, rely on radar to detect, range (determine the distance to), and map object/targets, such as enemy vehicles, which are within the radar's range. Once detected, tire combat platform is able to confront or evade the enemy vehicle more effectively based upon tire radar information.

In order to thwart detection by radar, many modern combat platforms employ various electronic measures to confuse, jam or trick recipient radar systems. Such electronic measures are typically referred to as "Electronic Warfare" (EW). The performance parameters of EW systems are typically kept in strict confidence. However, generally, the effects of EW actions can be classified as belonging to one or more of the following groups: masking, chaffing, drifting, concealment and multiplication of a target/s detected by the radar. The occurrence of a certain EW effect depends upon, inter-alia, the EW measure performed by the combat platform and the specifications of the recipient radar system.

Once an EW action is activated, a radar operator needs to identify the EW action and to distinguish its effects if he/she is to successfully counteract the EW action. Although some electronic aid may be available to an operator, the identification of an EW action and its effects relies mainly on an operator's perception. Thus, an essential part of a radar operator's training must focus on familiarizing a trainee with the manifestation of various EW actions on the operator's equipment.

In order to develop a trainee's perception with respect to the activation of the EW actions, credible simulations must be created for a trainee. If a trainee considers a presentation of an EW activation scenario to be inaccurate, he/she may disregard the presentation. Even more problematic is a situation whereby a trainee fails to recognize an inaccurate presentation. Under such circumstances, the presentation may be counter-productive by creating an incorrect knowledge-base in the mind of a trainee which may lead to miscomprehension in real-life scenarios.

Presently, there is no training or debriefing system which can provide an accurate presentation of a variety of EW activation scenarios, in particular, there is no training or debriefing system which can provide an accurate presentation of an EW activation scenario as it actually transpires during a training session involving combat platforms and including a realistic EW activation scenario. Furthermore, there is no such training or debriefing system which can provide a presentation which is based upon a comparison of the actual radar information as it appears on a radar operator's equipment with position data indicative of the actual position (position data) of a combat platform whose position and/or range may be incorrectly presented on the radar operator's equipment due to an EW action.

Therefore there is a need in the art for a system and method for processing and analyzing at least radar information modified in response to an EW action associated with a target, in order to allow comparing it with a representation of the special location of the target. There is a need in the art for a framing system and method for training radar operators in EW scenarios. There is a further need in the art to provide training in EW scenarios that utilizes existing radar and training systems and methods. There is a specific need in the art for a system and method capable of processing and analyzing radar information relating to a target and superimposing it onto a representation of the actual position of the target, where the radar information and the representation of the actual position of the target are generated by different and typically non-compatible systems.

SUMMARY OF THE INVENTION

According to one embodiment of the present invention there is provided a method of analyzing radar information of a radar system, comprising:

providing radar information including at least a portion modified in response to an EW (electronic-warfare) action;

obtaining position data corresponding to at least a position of a target associated with the EW action with respect to the radar system; and analyzing the radar information for comparing it with the position data, thereby allowing to determine at least one effect of the EW action on the radar information.

According to another embodiment of the invention, there is provided a system for analyzing radar information of a radar system, comprising:

an analyzer;

a first interface coupled to the analyzer, for receiving radar information including at least a portion modified in response to an EW (electronic-warfare) action; and a second interface coupled to the analyzer for receiving position data representative of at least a position of a target associated with the EW action with respect to the radar system;

wherein the analyzer in adapted to analyze the radar information for comparing it with the position data, thereby allowing to determine at least one effect of the EW action on the radar information.

According to yet another embodiment of the present invention, there is provided a method of training a user of a radar system against EW actions, comprising:

providing radar information including at least a portion modified in response to an EW (electronic-warfare) action;

obtaining position data corresponding to at least a position of a target associated with the EW action with respect to the radar system;

analyzing the radar information for comparing it with the position data and determining at least one effect of the EW action on the radar information; and displaying representations of radar information and the position data, thereby providing the user with positive training with respect to the EW action.

According to another embodiment of the present invention there is provided an AACMI system adapted for training a pilot in a training scenario that includes at least one EW action, the system comprising:

a debriefing center coupled to a communication network also shared by at least a first and second aircraft; the debriefing center is adapted to provide an image representation of the training scenario, based on position data corresponding to at least tire position of the first aircraft with respect to the second aircraft, communicated via the communication network;

an EW utility connectable to the debriefing center, the EW utility is adapted for:

i. receiving radar information corresponding to the first aircraft, including at least a portion modified in response to an EW (electronic-warfare) action perforated by at least the second aircraft; and ii. analyzing the radar information for comparing the radar information with at least the position data, thereby determining at least one effect of the EW action on the radar information;

wherein the debriefing center is further adapted for generating data usable for displaying a superimposition of an image indicative of the portion of the radar information modified in response to the EW action and of an image corresponding to the training scenario.

According to another embodiment of the present invention mere is provided a system adapted for training a radar operator in a training scenario that includes at least one EW action associated with a target, the system comprising:

a debriefing center adapted to provide an image representation of the training scenario, based on position data corresponding to at least the position of the target;

an EW utility connectable to the debriefing center, the EW utility being adapted for:

i. receiving radar information including at least a portion modified in response to an EW (electronic-warfare) action performed by at least the target; and ii. analyzing the radar information for comparing the radar information with at least the position data, thereby determining at least one effect of the EW action on the radar information;

wherein the debriefing center is further adapted for generating data usable for displaying a superimposition of an image indicative of the portion of the radar information modified in response to the EW action and of an image corresponding to the training scenario.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
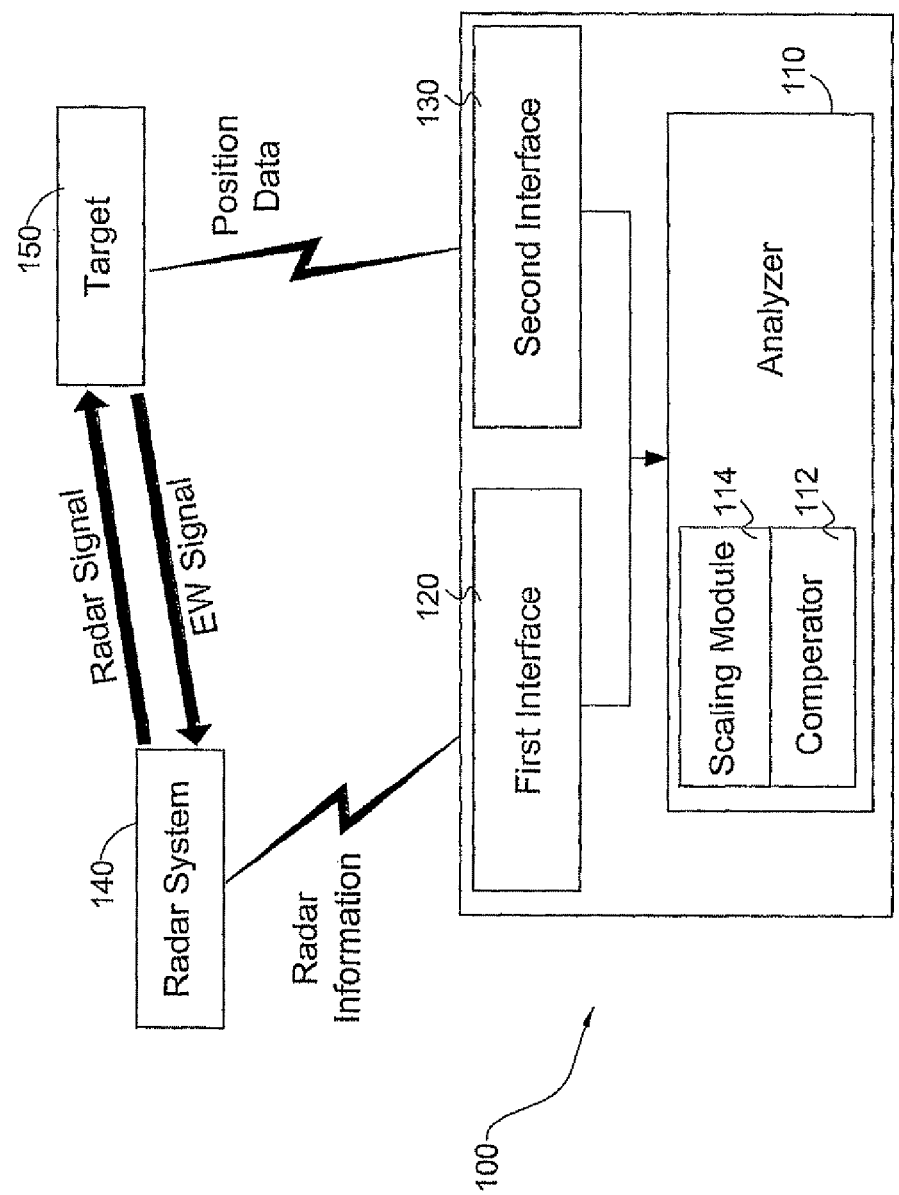
FIG. 1. is a block diagram illustration of a system for processing radar information of a radar system, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "analyzing", "processing", "computing", "calculating", "determining", "establishing", "comparing" or the like, unless stated otherwise, refer to tire action and/or processes of a computer or computing system, or similar electronic computing device, that manipulate and/or transform data represented as physical, such as electronic, quantities within tire computing system's registers and/or memories into other data similarly represented as physical quantities within the computing system's memories; registers or other such information storage, transmission or display devices.

Embodiments of the present invention may include an apparatus for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Reference is initially made to FIG. 1, which is a block diagram illustration of a system for processing radar information of a radar system, according to some embodiments of the present invention. According to some embodiments of the invention, the system for processing radar information of a radar system 100 may include a analyzer 110 and a first and second interface 120 and 130 respectively, each of which being operatively coupled to the analyzer 110. The first interface 120 may be configured to receive radar information, and particularly to receive radar information including at least a portion modified in response to an EW (Electronic Warfare) action. The first interface 120 may receive the radar information from a radar system 140 associated with the system for processing radar information of a radar system 100. The second interface 120 may be configured to receive position data, and particularly, to receive position data representative of at least a position of a target 150 associated with the EW action with respect to the radar system 140. The second interface 120 may receive the position data from at least a target 150 associated with the system for processing radar information 100.

The first interface 120 may include or may be associated with any suitable receivers, converters or other elements necessary to enable the receipt of the radar information. The second interface 130 may also include or be associated with any suitable receivers, converters or other elements necessary to enable it to obtain the position data. It would be appreciated that the source of fee EW action, i.e. the combat platform which activated the EW action, is not necessarily the target which is associated with the EW action and with which the position data corresponds. Specific examples of radar information sources and position data sources shall be provided below.

According to some embodiments of the present invention, the position data may be indicative of at least a relative range and direction of the target 150 with respect to the radar system 140. According to further embodiments of the present invention, fee position data may be based upon at least fee TSPI data (time-space-position indication data) of at least the target 150. According to yet further embodiments of the present invention, the position data may be further based upon the TSPI data associated with the radar system.

Figure 2:
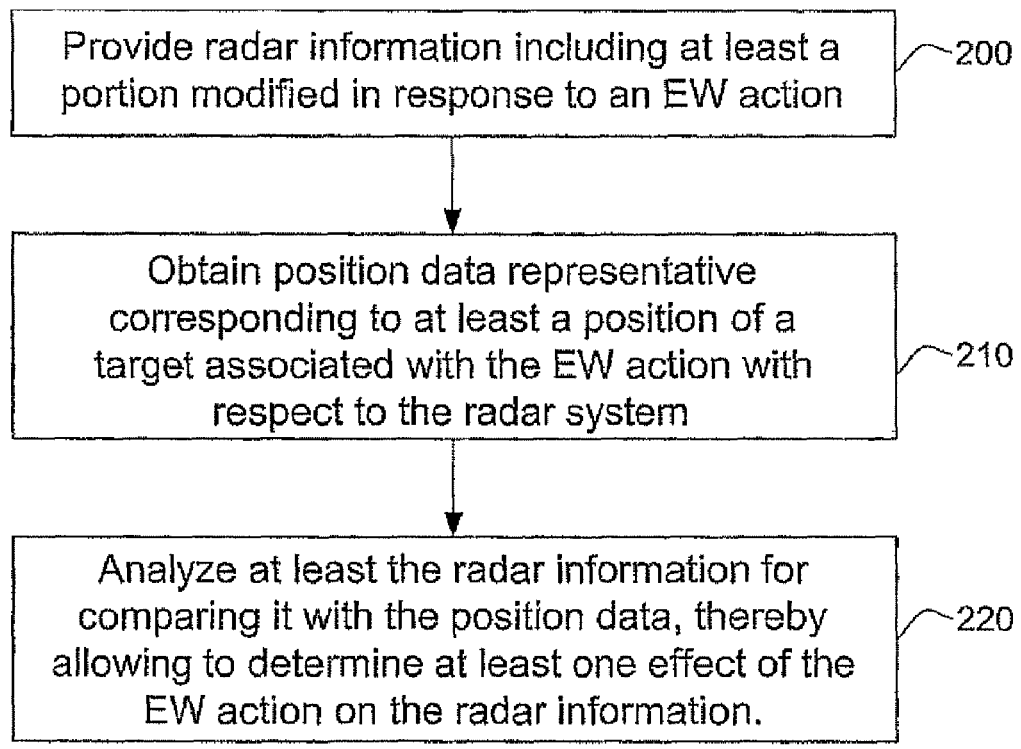
FIG. 2 is a flow chart illustration of a method of processing radar information of a radar system, according to some embodiments of the present invention.

Reference is now additionally made to FIG. 2, which is a flow chart illustration of a method of processing radar information of a radar system, according to some embodiments of the present invention. Initially, radar information including at least a portion modified in response to an EW action may be provided, for example, from a radar system 140 (block 200) and position data representative of an actual position of a target 150 (the one associated with the EW action) with respect to the radar system may be obtained (i.e. the relative position of target 150 with respect to the radar system 140) (block 210). The radar information may be provided by a radar system 140 and the position data may be determined based upon data obtained from the target 150 and from the radar system 140 or from a platform associated with the radar system 140 (such as an aircraft carrying the radar system). The radar information including at least the portion modified in response to an EW action (or actions) may be provided to the analyzer 110 through the first interface 120. The first interface 120 may be configured to adapt the radar information in a manner to enable the analyzer 110 to process the radar information. For example, the first interface 120 may be configured to A/D (analogue to digital) convert for an incoming radar information signal. The position data may be provided to the analyzer 110 through the second interface 120. The second interface may also be configured to adapt the position data in a manner to enable the analyzer 110 to process the position data.

The analyzer 110 may analyze at least the radar information for comparison with at least the position data, thereby allowing to determine at least one effect of the EW action on the radar information (block 220). According to some embodiments of the present invention, the analyzer 110 may include a comparator 112 adapted to and responsible for comparing the radar information with at least the position data. As mentioned above, the radar information includes at least a portion modified in response to an EW action. The position data may provide at least the spatial location of the target 150 associated with EW action with respect to the radar system at each instance of time (during the relevant period).

Thus, the analyzer 110 may analyze at least the radar information in a manner to enable an intelligible comparison between the radar information and the position data. By comparing the radar information and the position data, differences between at least the spatial position of a target 150 associated with the EW action as provided by the radar information and the spatial position of the target 150 associated with the EW action as represented by the position data (indicating the actual position of tire target) may be provided. These differences may be determined for each (relevant) instance of time and for each target associated with the EW action. Further details with regard to the comparison of the radar information and the position data shall be provided below.

Figure 3:
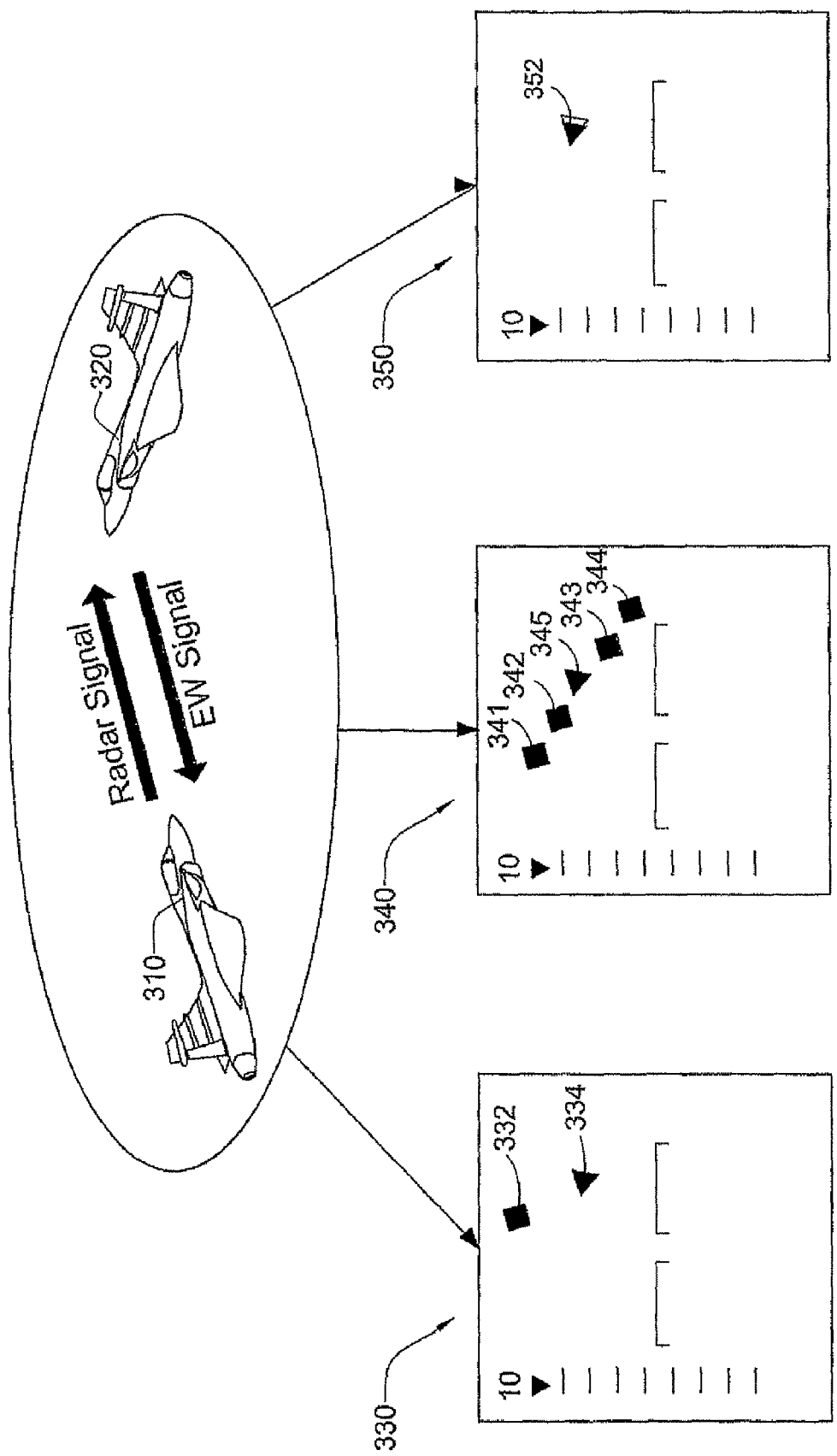
FIG. 3 is a schematic illustration of a training scenario according to some embodiments of the invention.

Reference is now made to FIG. 3, which is a schematic illustration of a training scenario according to some embodiments of the invention. A first aircraft 310 is engaged in a combat training with a second aircraft 320, In the non-limiting example of FIG. 3, the radar system 140 is onboard a first aircraft 310, and is the recipient of EW actions performed by aircraft 320. There are illustrated several schematic radar images 330-350 displayed on a radar screen of a first aircraft. Each image shows a different modified representation of a target associated with a certain type of EW action activated against the first aircraft. Different types of EW actions are activated against the radar system 140. Each type of EW action activated against the radar system 140 affects the radar system 140 differently with respect to the second aircraft 320 which is associated with die EW action. Thus, the radar-screen of the first aircraft 310 provides different radar images which represent the effect on the radar information of each of the different types of EW actions used.

Radar image 330 represents the effect of a chaffing type EW action on the radar system 140, as is presented to the radar operator by the radar screen. Artifact 332 represents the spatial position of the second aircraft 320, serving as the target 150 associated with the EW action, with respect to the radar system 140 (and the first aircraft 310), whereas virtual artifact 334 (not actually seen on the radar screen) is a representation of the actual spatial position of the second aircraft 320 with respect to the radar system 140. As can be seen in FIG. 3, a chaffing type EW action will typically cause a target associated with the EW action to be misplaced by the radar system. A chaffing type EW action may cause a radar operator and systems associated with the radar system to have incorrect data with respect to tire position of the target associated with the EW action.

Radar image 340 represents the effect of a target multiplication type EW action on the radar system 140, as is presented to the radar operator by the radar screen. Artifacts 341-344 represent the spatial positions of multiple artificial duplication of the second aircraft 320, with respect to the radar system 140 (and the first aircraft 310), whereas artifact 335 is a representation of the actual spatial position of the second aircraft 320 with respect to the radar system 140. In the case of a target multiplication type EW action, typically, the artifact representing the target 150 is usually shown alongside one or more artificial duplicates of the real target 150. A target multiplication type EW action may typically cause a radar operator and systems associated with the radar system to be unable to identify which, of the targets shown on the radar screen is real and which is a synthetic multiplication of the real target.

Radar image 350 represents the effect of a masking or target concealment type EW action on the radar system 140, as it is presented on the radar screen. Virtual artifact 352 (not actually seen on the radar screen) is a representation of where the second aircraft 320, serving as the target associated with the EW action, should have been illustrated on the racial screen of the radar system 140. However, as a result of the masking type EW action, the second aircraft 320 has become invisible to the radar system 140, and consequently, on the radar screen no artifact associated with the second aircraft 320 is shown. As can be seen in FIG. 3, a masking or target concealment type EW action will typically cause a target associated with the EW action to be transparent or undetectable to the radar system. A masking or target concealment type EW action may cause a radar operator and systems associated with tire radar system to be blind with respect to the position of a target associated with the EW action.

Various EW systems and various radar systems are known, and the present invention may be applicable in combination with any presently available or yet to be devised in the future EW system and/or with any radar system. In one exemplary implementation of a system 100 according to some embodiments of the invention, the radar system 140 may be implemented onboard a first aircraft, and a second aircraft having an EW system installed thereupon may serve as tire target 150. The EW action may cause radar information generated by the radar system 140 onboard the first aircraft to be modified. In another exemplary implementation of a system 100 according to some embodiments of tire invention, the radar system 140 may be part of a land or ship based anti-aircraft weapon system and an aircraft (or any other radar detectable combat platform) having an EW system installed thereupon may serve as the target 150.

The system 100 may be used to provide substantially reliable data with respect to at least one effect of the EW action on at least a portion of the radar information. According to further embodiments of the invention, die system 100 may be implemented as pail of a debriefing center and may provide an operator of a radar system with substantially reliable data with respect to die differences between at least the position of the target 150 as provided by the radar information and the actual position of die target 150 associated with the EW action as represented by the position data. Note that during training the operator of the radar system sees modified radar information, e.g. images 330-350, where artifact 334 is indistinguishable from artifact 332 (in image 330), artifact 345 is indistinguishable from artifacts 341-344 (in image 340) and artifact 352 is invisible (in image 3.50). According to some embodiments of the present invention, visual representations of the modified radar data and actual position data corresponding to the (aircraft 320)—e.g. images 330-350 illustrated in FIG. 3, are available e.g. during debriefing. Some implementations of the system 100 will be discussed in greater detail below.

It would be appreciated that the portion of die radar information modified in response to an EW action may relate to more than one target, and position data may be obtained for more than one target which is associated with the EW action. Accordingly, the analyzer 110 may analyze at least the radar information in a manner to enable an intelligible comparison between the radar information and the position data of each of the one or more targets associated with the EW action. By comparing the radar information and the position data, differences between the positions of targets associated with the EW action as provided by the radar information and the actual positions of the targets as represented by the position data may be provided. These differences may be determined for each (relevant) instance of time and for each target associated with the EW action.

For convenience purposes, in the following description of the invention, reference shall be made to the terms "relative position data" and "relative TSPI data" which relate to the relative range and direction of a target associated with an EW action with respect to a radar system affected by the EW action. The position or TSPI data may be provided by e.g. an AACMI (Autonomous Air Combat Maneuvering Instrumentation) system common to the aircrafts 310, 320 and the debriefing center, INS (Inertial Navigation System) systems and/or satellite positioning systems (e.g. GPS, Galileo) and the like. The relative TSPI data (Time and Space data) of a target may be provided by the difference between the TSPI data corresponding to the target associated with the EW action and the TSPI data corresponding to the radar system affected by the EW action. The TSPI data corresponding to the radar system is typically provided by the TSPI data of the platform onboard which the radar system is installed (for example, an aircraft). However, it should be noted that some embodiments of the invention are not limited in this respect. Rather, according to embodiments of the present invention, any other suitable position data may be used to provide the position of a target associated with the EW action and/or for providing the position of the radar system.

Figure 4:
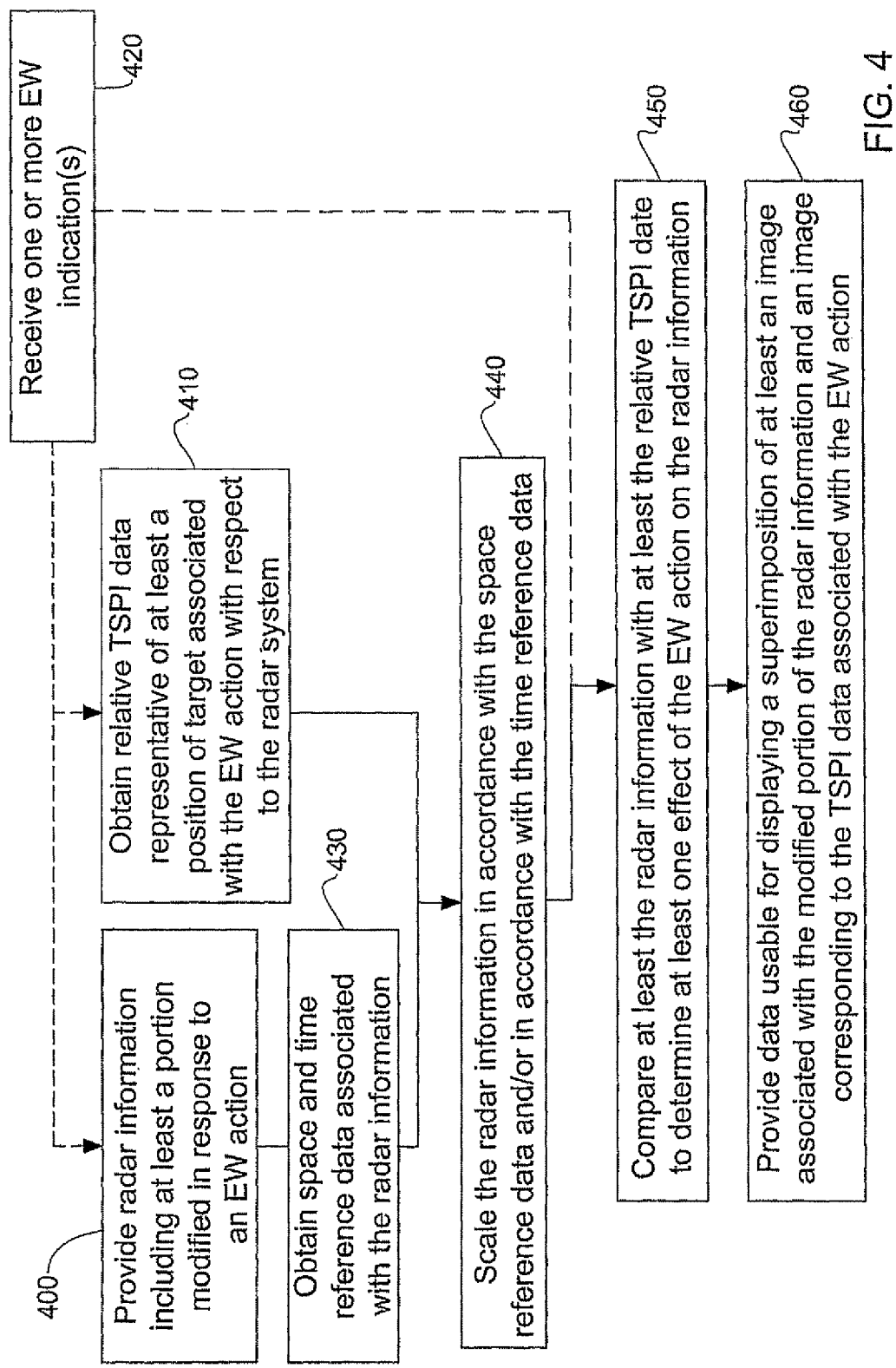
FIG. 4 is a flowchart illustration of a method of processing radar information of a radar system, according to some embodiments of the present invention.

Reference is now made to FIG. 4, winch is a flowchart illustration of a method of analyzing radar information of a radar system, according to some embodiments of the present invention. Here, radar information including at least a portion modified in response to an EW action may be provided (block 400) and relative TSPI data representative of at least a position of a target 150 associated with the EW action with respect to the radar system may be obtained (block 410). It should be noted that instead of the relative TSPI data, TSPI data corresponding to each of the target associated with the EW action and the radar system may be received, and based on the TSPI data corresponding to each of the target and the radar system, the relative TSPI data of the target with respect to the radar system may be determined at the system 100.

According to some embodiments of the invention, as an optional addition to the radar information and the relative TSPI data, an EW indication may be received at the system 100 and provided to the analyzer 110 (optional block 420). The EW indication may correspond to, but is not limited to, one or more of the following: an activation of an EW action, a type of an activated EW action, a termination of an EW action. For example, the EW indication may correspond to one of the following types of EW action: chaffing, masking, target drifting, target multiplication and target concealment.

According to further optional embodiments of the present invention, the EW indication may serve as a trigger for the processing of at least the radar information and the relative TSPI data. For example, the analyzer 110 may be configured to compare at least the radar information with the relative TSPI data only in response to a receipt of an EW indication, for example, in response to a receipt of an EW indication that an EW action has been activated. According to further embodiments of the present invention, the system 100 may switch from an inactive mode to an active mode in response to a receipt of an EW indication, indicating that an EW action has been activated. The system 100 may be configured to receive the radar information and/or the relative TSPI data only when it is in the active mode. The EW indication may also be used by the system 100 to determine which data should be requested or allowed into the system 100. According to further embodiments of the invention, the analyzer 110 may be configured to terminate die processing of the radar information upon receiving an appropriate EW indication, for example, an EW indication associated with the termination of the EW action with which the target is associated. The system 100 may be switched to the inactive mode once an EW indication is received, indicating the termination of the EW action.

It would be appreciated that many radar systems are implemented as inaccessible "black boxes", and in many cases, the only available data from these radar systems is the image displayed on the radar screen or the corresponding image data (the data that is translated by the radar screen to provide the radar image). Furthermore, the methodologies and techniques utilized by many radar systems to generate the image data (the data that is displayed on the radar screen) are confidential and non-replicable, and sometimes even use randomality. Therefore, some embodiments of the present invention suggest using a sequence of video images to capture the output of the radar system as it is presented on a radar display screen. The video images of the radar display screen are thus used to provide at least the portion of the radar information which has been modified in response to an EW action. As is explained in further detail below, the system may analyze the data corresponding to the video images of the radar display screen to determine the spatial and/or temporal reference parameters associated with each frame. As is also explained in further detail below, the spatial and/or temporal reference parameters may be needed for enabling scaling of the radar information, so that it may be compared with other data relating to the spatial position of the target associated with the EW action.

Many EW systems axe also implemented as inaccessible "black boxes", and often also utilize methodologies and techniques which are confidential and non-replicable and sometimes even use randomality. In addition, the effect of many EW systems on radars is influenced by the relative position of the EW system and the radar system. Therefore, some embodiments of the present invention suggest using an actual combat platform (such as an aircraft, for example) to carry an EW system and to generate an EW action in a manner to modify at least a portion of the radar information generated by that radar system in response to tire EW action. Under these circumstances, it would be understood that the use of an actual combat platform as the source of the EW action may contribute to the authenticity of tire framing scenario.

However, as explained above, when using real radar and EW systems in training and simulation scenarios, since both the radar system and the EW system are typically inaccessible and non-replicable, in many cases, tire only available indication with regard to the effect of the EW action on the radar system is the radar image displayed on the radar screen or the corresponding image data, which represents tire result of the EW action. The radar information, and subsequently the radar image which is based upon the radar information, are modified in response to the EW action. Thus, the image on the radar screen does not provide correct data with respect to the actual relative position of the target, or in other cases, it is not clear from the radar image which artifact corresponds to a real target and which artifact is artificially injected into the radar image by the EW action. In order to provide reliable and comprehensive data with respect to the effect of tire EW action on the radar system, the difference between the relative position of the target associated with the EW action as provided by the radar information and the actual position of the target 150 needs to be established. In order to establish these differences, some embodiments of the present invention suggest using relative position data such as the relative TSPI data corresponding to the position of the target 150 associated with the EW action with respect to the radar system to provide substantially reliable data representing the relative spatial position of the target.

According to some embodiments of the invention, the position data and the radar information do not comply with one another, as is typical for information generated by different and incompatible systems. For example, the TSPI data may be provided by an AACMI system which is not configured to collect radar information. In such a case the radar information can be separately collected e.g. by collecting digital radar data (e.g. available on the avionic data bus) or by collecting video images of the radar display (e.g. using onboard CVDFR (Cockpit Voice and Digital flight recorder) or DVTR (Digital Video Tape Recorder). Typically, radar systems provide variable scale display, e.g. display with, maximum range of 20/40/60/80 miles. Hence, space and time scaling is required to enable comparison of the position data with the radar information.

According to some embodiments of the invention, space and/or time reference data associated with at least the radar information may be received at the system and may be provided to the analyzer 110 (block 430). By non-limiting examples, such indications may be a digital scaling indication of the radar information—usable for space scaling, audio indication corresponding to start and/or end of video recording—usable for time scaling, and more. The analyzer 110 may be adapted to use the space and/or time-reference data to scale at least the radar information (block 440), as necessary. According to some embodiments of the present invention, the analyzer 110 may include a scaling module 114 adapted to and responsible for scaling at least die radar information. The scaling of at least the radar information shall be described in further detail below.

According to some embodiments of the present invention, the radar information received at die system 100 may include a sequence of video-images on a radar screen used for displaying a radar image. The video sequence may originate in a video camera suitably positioned for capturing the radar screen, e.g. onboard CVDFR or DVTR. Any suitable video camera may be used. The radar information may include the video sequence either in its original format or as a modified version of the video sequence, for example, as a digital file including digital video.

The radar screen may provide the operator of the radar system 140 with a graphical illustration of the relative spatial position(s) of a target (one or more) which is (are) within the radar system's 140 range and as it is seen by the radar system. Thus, radar information which corresponds to or includes a video representation of the radar screen is representative of the radar images as seen by the radar operator. However, a video representation, in digital or analogue format, does not inherently provide spatial and/or temporal reference parameters with respect to each frame in the video sequence. In fact, in some radar systems, the spatial reference parameters of the radar screen may be adjustable, and may be adjusted either automatically, for example, in accordance with the spatial distance of the target from radar system, or manually, by the user. Since a practical comparison between the radar information and the relative TSPI data requires that a certain scale be established between the information and the data to be compared, appropriate spatial and/or temporal reference parameters may be required in order to establish the scale.

According to some embodiments of the invention, the space and/or time reference data may be embedded within the radar information provided to the system 100, or may be distinct from the radar information and may be provided separately. The radar information, being based upon a video sequence, may not inherently include spatial and/or temporal reference parameters, which therefore may need to be generated or determined separately.

According to some embodiments of the invention, the spatial and/or temporal reference parameters may be generated outside the video capturing equipment substantially in parallel to the capturing of the video images and may be added to the radar information together with the data corresponding to the video sequence. For example, the spatial and/or temporal reference parameters may be obtained from the radar system 140. In accordance with another example, the spatial and/or temporal reference parameters may be obtained from other systems or devices associated with tire radar system 140. In this case the spatial and/or temporal reference parameters may be added or attached to the radar information together with the data corresponding to the video sequence, and upon receiving the radar information at tire system 100, the reference data is separated, if necessary, from the data corresponding to the video sequence and is used to scale the video sequence so that it may be compared with the relative TSPI data.

However, in accordance with other embodiments of the invention, the spatial and/or temporal reference parameters may not be provided to the system 100 as part of the radar information. In this case, the spatial and/or temporal reference parameters may need to be inferred from the video sequence. In order to determine the spatial and/or temporal reference parameters of the video image, the system 100 may need to preprocess at least the radar information in order to obtain the reference parameters, before it can process the radar information for comparing it with the relative TSPI data. As part of preprocessing at least the radar information, the video sequence may be analyzed using various automatic and/or manual techniques to determine the spatial and/or temporal reference parameters of die video sequence. Examples of techniques for determining the spatial reference parameters of a video sequence include, for example, image processing, character recognition, visual recognition of spatial reference data appearing on radar screen, etc. In one example, a video sequence may be analyzed using a character recognition technique, and by identifying and recognizing a specific character or characters appearing on the radar screen, the spatial reference of each frame in die sequence of video images may be determined. Examples of techniques for determining die temporal reference parameters of a video sequence include: associating each frame (or a predefined number of frames) of die video sequence with die corresponding GPS time, injecting each frame (or a predefined number of frames) with an audible and/or visual signal, such as a time counter or a PSTN signal. The injected audible and/or visual signal may be extracted, for example, by die analyzer 110 and may be used for tune scaling die video sequence.

In accordance with a further embodiment of the invention, the spatial and/or temporal reference parameters may be manually provided to the analyzer by an operator of the system 100. The operator may determine the spatial and/or temporal reference parameters by analyzing, manually or automatically, the video sequence corresponding to the radar screen and associated data, if such data is relevant.

According to some embodiments of the invention, as part of scaling of the radar information, die analyzer 110 may determine the spatial and/or temporal reference parameters of the relative TSPI data. For example, the analyzer may be configured to determine the scale (maximum range) of a certain radar video image, or to generate time tags to each video image to enable synchronization of the images with the TSPI data. The analyzer 110 may use the spatial and/or temporal reference parameters of the relative TSPI data and the space and/or time reference data associated with the radar information to scale at least die radar information. According to further embodiments of die invention, the spatial and/or temporal reference parameters of the relative TSPI data may be predefined, and the scaling of at least the radar information may be performed based upon the predefined spatial and/or temporal reference parameters of the relative TSPI data.

It would be appreciated that by comparing the scaled radar information representing the radar image as seen by the operator of the radar screen and the relative spatial position(s) of the target(s) represented by the relative TSPI data, a substantially accurate representation illustration of at least one effect of an EW action on the radar information may be obtained.

After scaling operation of at least one video image Is complete, the analyzer 110 may compare the radar information (video image) with at least the relative TSPI data to determine at least one effect of the EW action on the radar information (block 450). As part of comparing operation of the radar information and the relative TSPI data, the analyzer 110 may determine at least the one effect of the EW action on the radar information. According to some embodiments of the invention, as part of determining the effect of the EW action on the radar information, the analyzer 110 may determine at least the difference between the relative spatial location of the target 150 as provided by radar information and the relative spatial location of the target 150 as provided by the relative TSPI data. The analyzer 110 may determine the difference between the relative spatial locations of the target 150 at each instance of time. The analyzer 110 may continue to determine the difference between the relative spatial locations of the target 150 provided by each portion of the radar information (e.g. a sequence of video images) and tire relative TSPI data until the end of the activation of the EW action (regardless of the reason for termination thereof). The end of the activation of the EW action may be determined based upon an appropriate EW indication.

According to some embodiments of the invention, based upon the comparison of the radar information and the relative TSPI data, the analyzer 110 may be adapted to provide visual representations indicative of the EW action. According to further embodiments of the invention, the analyzer 110 may be adapted to provide data usable for displaying a superimposition of at least an image associated with the portion of the radar information modified in response to the EW action and of an image corresponding to the relative TSPI data (block 460). In accordance with further embodiments of the invention, the analyzer may further add data corresponding to EW indication(s) associated with the EW action. The data corresponding to the EW indication(s) may be added to the data usable for displaying the superimposition in a manner to cause the data corresponding to the EW indication(s) to also be displayed.

Figure 5:
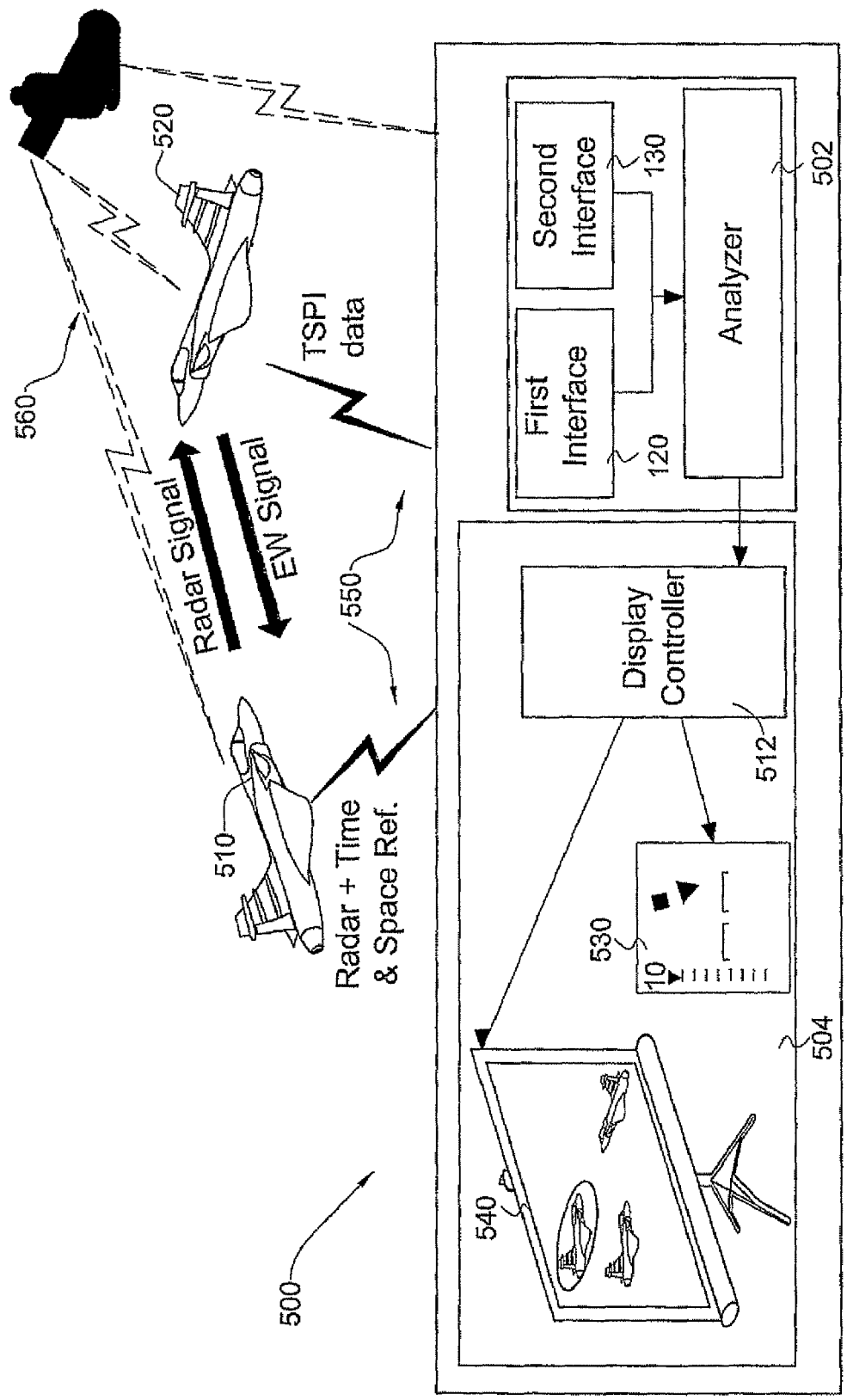
FIG. 5 is a block diagram illustration of a system for analyzing radar information of a radar system and of associated systems, according to some embodiments of the present invention.

Reference is now made to FIG. 5, which is a block diagram illustration of a training system adapted for training a pilot in a training scenario that includes at least one EW action, according to some embodiments of the present invention. In FIG. 5, there is shown a training system 500 which includes an EW utility 502 and a debriefing center 504. The debriefing center 594 may be operatively connected to the EW utility 502. Further in FIG. 5, die radar system 140 which is die source of the radar information is mounted on a first aircraft 510 and the target 150 associated with the EW action is a second aircraft 520.

The EW utility 502 may include the analyzer 110 and die first and second interfaces 120 and 130, described above in greater detail. The EW utility 502 may be adapted to receive from die first aircraft 520, radar information including at least a portion modified in response to an EW action associated with the second aircraft 520. For example, the EW action associated with the second aircraft may be an EW action generated by the second aircraft 520.

The first aircraft 510 may include a video camera (not shown) usable for capturing die radar screen of the radar system 140 mounted on the first aircraft 510. Any suitable video camera suitable for capturing a radar screen (in this case within an aircraft) may be used. For example, the video camera may be part of the aircraft's CVDFR equipment. The second aircraft 520 may include an EW system (not shown). The EW system installed in die second aircraft 520 may be activated in a manner to affect die radar system 140 mounted on the first aircraft 510. The EW system may affect die radar system 140 in a manner to modify at least a portion of the radar image displayed on the radar screen of the radar system 140. For example, the EW system may cause the radar system to provide false readings with respect to die position of the second aircraft 520, or it may hide the second aircraft 520 from the radar system 140 altogether. The first and die second aircrafts 510 and 520 may each also include a TSPI data gathering module (not shown) usable for collecting TSPI data representing the time, space and position parameters of the aircrafts 510 and 520. TSPI data from each of the TSPI data gathering modules of the first 510 and second 520 aircrafts may be collected and processed to provide the relative TSPI data. An example of a TSPI data gathering module is disclosed in U.S. Pat. No. 5,587,904, filed on Jun. 10, 1994. Another example of a TSPI module is the 'EHUD' AACMI (Autonomous Air Combat Maneuvering Instrumentation) system commercially available by Israel Aircraft Industries, Israel.

It would be appreciated that in case the radar system is substantially stationary, for example, when it is part of a substantially stationary land-to-air weapon system, the position of the radar system is fixed and known. Thus, in order to determine tire position data corresponding to the target associated with the EW action with respect to the radar system (for example, the relative TSPI data of the target), it may be sufficient to obtain the spatial position data of the target.

The first aircraft 510 aria/or the second aircraft 520 may be operatively connected to the system 100 via a wireless communication link (data link) 550, via a satellite communication link 560 or the first aircraft and/or the second aircraft 520 may be physically connected to the system 100 using physical connections (not shown). An example of an appropriate wireless/satellite based network which may be used to provide the system 100 with the radar information and/or with tire TSPI data is disclosed in U.S. Pat. No. 5,587,904, filed on Jun. 10, 1994. It should be noted that some embodiments of the invention are not limited in this respect. The first and second interfaces 120 and 130 may be configured to enable each of the abovementioned connection types or only one specific type of connection.

The EW utility 502 may analyze at least the radar information for comparing it with the relative TSPI data. The EW utility 502 may process at least the radar information in a manner similar to that which was discussed above in detail with reference to FIG. 4. As a result of the processing of at least the radar information, the EW utility 502 may be adapted to provide data usable for displaying an image indicative of at least the portion of the radar information modified in response to the EW action. For example, the EW utility 502 may be adapted to provide data usable for displaying a superimposition of at least an image associated with the portion of the radar information modified in response to the EW action and of an image corresponding to the position of the target with respect to the radar system. According to further embodiments of the invention, the EW utility 502 may be adapted to provide data usable for displaying a superimposition of at least an image associated with the portion of the radar information modified in response to the EW action and of an image corresponding to the relative TSPI data. In accordance with further embodiments of the invention, the EW utility 502 may further add to the data usable for displaying the superimposition of at least die radar information and the relative TSPI data, data corresponding to EW indication(s) associated with die EW action. The data corresponding to the EW indication(s) may be added to the data usable for displaying die superimposition.

According to some embodiments of die present invention, the debriefing center 504 may include a radar screen display 530 and a graphical display 540. The radar screen display 530 may provide a simulation of a screen of a radar system, for example, such as the one used in the first aircraft 510. The graphical display may provide a graphical illustration of a training scenario including the relative spatial positions of the aircrafts participating in the training scenario, in this case the first and the second aircrafts 510 and 520 respectively.

The EW utility 502 may input the data usable for displaying an image indicative of at least the portion of the radar information modified in response to the EW action to the debriefing center 504. The debriefing center 504 may use the data from the EW utility 502, either directly or after it has been rendered by a display controller 512, to display at least the image indicative of at least the portion of the radar information modified in response to the EW. For example, the debriefing center 504 may use the data from the EW utility 502 to display a superimposition of at least an image associated with the portion of the radar information modified in response to the EW action and of an image corresponding to the position of the target with respect to the radar system. According to further embodiments of the invention, the debriefing center 504 may use the data from the EW utility 502 to display a superimposition of at least the modified portion of the radar information and the relative TSPI data.

According to further embodiments of the present invention, the display data corresponding to the superimposition of at least die modified portion of the radar information and the relative TSPI data may be provided to the radar screen display 530 for representation thereupon. On the radar screen display 530, die radar information portion of the display data may be used to provide a substantially accurate representation of the image seen by the operator of the radar system 140 onboard the first aircraft 510. As mentioned above, this image is based upon false readings induced in response to the EW action. The relative TSPI data portion of the display data may be used to provide a representation on tire radar screen display 530 of the relative spatial position of the target 150, in this case the second aircraft 520 with respect to the radar system. It would be appreciated that, with respect to the actual relative position of tire second aircraft 520, the representation which is based upon the relative TSPI data may be substantially more reliable than the representation which is based upon the modified radar information, since, unlike the radar information, it was not affected by the EW action. According to some embodiments of the invention, the visual data associated with both portions of the superimposition may be displayed simultaneously, thereby providing a visual illustration of at least one effect of the EW action on the radar information.

According to further embodiments of the present invention, either in addition to or alternatively, the display data corresponding to the superimposition of at least the modified portion of the radar information and the relative TSPI data may be provided to the graphical display 540 for representation thereupon. On the graphical display 540, the radar information portion of the display data may be used to provide a representation of the position of the second aircraft 520 as seen on the radar display of the radar system 140 onboard the first aircraft 510. The relative TSPI portion of the display data may be used to provide a representation of the relative position of the second aircraft 520 as represented by the relative TSPI data. The representation of the relative position of the second aircraft 520 as provided by the relative TSPI data may be superimposed over the representation of the relative position of the second aircraft 520 as seen on the radar display of the radar system 140, or vice-versa. The graphical display 540 may also show the position of the first aircraft 510. The position of the first aircraft 510 may be provided by relative TSPI data in accordance with the relative position of the second aircraft 520 with respect to the first aircraft 510.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of training a user of a radar system in connection with EW actions, comprising
    a) obtaining data representative of at least one radar image indicative of a target spatial position as measured by the radar, wherein at least a portion of said image is affected by an EW (electronic-warfare) action;
    b) obtaining from a radar-independent source data indicative of at least the spatial position of the target; and
    c) displaying the obtained radar image and/or derivatives thereof in a manner indicative of a discrepancy with the spatial position obtained from said radar-independent source, thereby facilitating training the user at least with respect to the affect of EW action on the radar imaging indicative of the target spatial position.

2. A method according to claim 1, wherein the data indicative of at least the spatial position of the target is indicative of at least a relative range and direction of the target with respect to the radar system.

3. A method according to claim 1, wherein the data indicative of at least the spatial position of the target is based upon at least the TSPI (time-space-position indication) data of at least the target.

4. A method according to claim 3, wherein the data indicative of at least the spatial position of the target is further based upon the TSPI data associated with the radar system.

5. A method according to claim 4, wherein said obtaining comprises obtaining the TSPI data from an AACMI (Autonomous Aircraft Maneuvering Instrumentation) system.

6. A method according to claim 5, wherein the TSPI data of the target is obtained from the target.

7. A method according to claim 1, wherein said obtaining data representative of at least one radar image comprises obtaining data generated by a CVDFR (Cockpit Voice and Digital Flight Recorder).

8. A method according to claim 1, wherein the EW action corresponds to one or more of the following EW actions: chaffing, masking, target drifting, target multiplication and target concealment.

9. The method of claim 1, further comprising:
    a) processing said obtained data representative of said at least one radar image in order to generate parameters characterizing a spatial scaling to be provided to said image; said parameters enabling perceptibility of said discrepancy; and
    b) displaying the radar image and/or derivatives in accordance with said generated parameters.

10. The method of claim 1, wherein an effect of the EW action on the radar image is simulated in accordance with pre-defined training scenario.

11. The method according to claim 1, wherein said data representative of at least one radar image is a video image of the radar display screen.

12. The method according to claim 1, further comprising:
    a) obtaining an EW indication comprising at least one of the following: activation of the EW action, termination of the EW action, type of said activated EW action; and
    b) displaying information derived from said EW indication along with displaying the obtained radar image and/or derivatives thereof in a manner indicative of a discrepancy with the spatial positions obtained from said radar-independent source.

13. The method according to claim 1, wherein said displaying further includes:
    a) Superimposing a representation of said target on said obtained radar image and/or derivatives thereof, said representation corresponds to the spatial position obtained from said radar-independent source data.

14. A method according to claim 9, wherein said spatial scaling comprises obtaining reference data associated with at least said data representative of at least one radar image.

15. A system for training a user of a radar system in connection with EW actions, comprising:
    a) an analyzer;
    b) a first interface operatively coupled to the analyzer and adapted to obtain data representative of at least one radar image indicative of a target spatial position as measured by the radar, wherein at least a portion of said image is affected by an EW (electronic-warfare) action; and
    c) a second interface operatively coupled to the analyzer and adapted to obtain from a radar-independent source data indicative of at least the spatial position of the target;
    wherein the analyzer is adapted to provide data usable for displaying the obtained radar image and/or derivatives thereof in a manner indicative of a discrepancy with the spatial position obtained from said radar-independent source, thereby to facilitate training the user at least with respect to the affect of EW action on the radar imaging indicative of the target spatial position.

16. A system according to claim 15, wherein the data indicative of at least the spatial position of the target is indicative of at least a relative range and direction of the target with respect to the radar system.

17. A system according to claim 16, wherein the data indicative of at least the spatial position of the target is based upon at least the TSPI data of at least the target.

18. A system according to claim 17, wherein the data indicative of at least the spatial position of the target is further based upon TSPI data associated with the radar system.

19. A system according to claim 17, wherein said analyzer is adapted to obtain reference data associated with at least the data representative of at least one radar image.

20. A system according to claim 14, wherein said analyzer is adapted for receiving data relating to the EW action and for classifying the EW action as one of a group containing: chaffing, masking, target drifting, target multiplication and target concealment.

21. A system according to claim 20, wherein said second interface is operatively connected to an AACMI (Autonomous Aircraft Maneuvering Instrumentation) system, and wherein the TSPI data is received from the AACMI system.

22. A system according to claim 20, wherein said second interface is operatively connected to a target, and wherein the TSPI data is received from the target.

23. A system according to claim 15, wherein said first interface is configured to receive data representative of a viewable radar image.

24. A system according to claim 23, wherein the data representative of the viewable radar image is a sequence of video images displayed on a radar screen.

25. A system according to claim 24, wherein the data representative of the viewable radar image is received from a CVDFR.

26. A system according to claim 15, wherein said analyzer is adapted to provide data usable for displaying an image indicative of the portion of the radar information modified in response to an EW action.

27. A system according to claim 26, wherein said displaying comprises superimposing an image indicative of the portion of the radar information modified in response to an EW action onto an image corresponding to the position of the target with respect to the radar system.

28. A system according to claim 18, wherein said analyzer is adapted to provide data usable for displaying a superimposition of an image indicative of the portion of the radar information modified in response to an EW action and of an image corresponding to the TSPI data of the target and to the TSPI data of the radar system.

29. A system according to claim 15, wherein the analyzer is further adapted to:
  a) process said obtained data representative of said at least one radar image in order to generate parameters characterizing a spatial scaling to be provided to said image; said parameters enabling perceptibility of said discrepancy; and
  b) provide data usable for displaying the radar image and/or derivatives in accordance with said generated parameters.

30. A system according to claim 15, wherein the analyzer is further adapted to simulate an effect of the EW action on the radar image in accordance with pre-defined training scenario.

31. A system according to claim 15, wherein said data representative of at least one radar image is a video image of the radar display screen.

32. A system according to claim 15, wherein the analyzer is further adapted to:
  a) obtain an EW indication comprising at least one of the following: activation of the EW action, termination of the EW action, type of said activated EW action; and
  b) provide data usable for displaying information derived from said EW indication along with displaying the obtained radar image and/or derivatives thereof in a manner indicative of a discrepancy with the spatial positions obtained from said radar-independent source.

33. A system according to claim 15, wherein the analyzer is further adapted to provide data usable for superimposing a representation of said target on said obtained radar image and/or derivatives thereof, said representation corresponds to the spatial position obtained from said radar-independent source data.

34. An AACMI system adapted for training a pilot in a training scenario that includes at least one EW action, the system comprising:
  a) a debriefing center coupled to a communication network also shared by at least a first and second aircraft; the debriefing center is adapted to provide an image representation of the training scenario, based on position data corresponding to at least the position of the first aircraft with respect to the second aircraft, communicated via the communication network;
  b) an EW utility connectable to the debriefing center, the EW utility is adapted for:
    i) receiving radar information corresponding to the first aircraft, including at least a portion modified in response to an EW (electronic-warfare) action performed by at least the second aircraft; and
    ii) analyzing the radar information for comparing the radar information with at least the position data, thereby determining at least one effect of the EW action on the radar information;
  wherein the debriefing center is further adapted for generating data usable for displaying a superimposition of an image indicative of the portion of the radar information modified in response to the EW action and of an image corresponding to the training scenario.

35. The AACMI system of claim 34, wherein the debriefing center is further adapted for receiving an EW data generated by an EW system onboard the second aircraft, and for using the EW data to perform at least one of the following:
  a) triggering said analyzing of the radar information;
  b) triggering said superimposition;
  c) classifying the EW action as one of a group containing: chaffing, masking, target drifting, target multiplication and target concealment.

36. A program storage device readable by machine, tangibly embodying a program of instructions executable by the machine to perform a method of training a user of a radar system in connection with EW actions, comprising:
  a) obtaining data representative of at least one radar image indicative of a target spatial position as measured by the radar, wherein at least a portion of said image is affected by an EW (electronic-warfare) action;
  b) obtaining from a radar-independent source data indicative of at least the spatial position of the target; and
  c) displaying the obtained radar image and/or derivatives thereof in a manner indicative of a discrepancy with the spatial position obtained from said radar-independent source, thereby facilitating training the user at least with respect to the affect of EW action on the radar imaging indicative of the target spatial position.

37. A computer program product comprising a computer useable medium having computer readable program code embodied therein of training a user of a radar system in connection with EW actions, the computer program product comprising:
  a) computer readable program code for causing the computer to obtain data representative of at least one radar image indicative of a target spatial position as measured by the radar, wherein at least a portion of said image is affected by an EW (electronic-warfare) action;
  b) computer readable program code for causing the computer to obtain from a radar-independent source data indicative of at least the spatial position of the target; and
  c) computer readable program code for causing the computer to display the obtained radar image and/or derivatives thereof in a manner indicative of a discrepancy with the spatial position obtained from said radar-independent source, thereby facilitating training the user at least with respect to the affect of EW action on the radar imaging indicative of the target spatial position.

* * * * *

UNITED STATES PATENT AND TRADEMARK OFFICE
CERTIFICATE OF CORRECTION

| | | |
|---|---|---|
| PATENT NO. | : 7,821,442 B2 | Page 1 of 1 |
| APPLICATION NO. | : 12/096992 | |
| DATED | : October 26, 2010 | |
| INVENTOR(S) | : Jacob Ilan | |

It is certified that error appears in the above-identified patent and that said Letters Patent is hereby corrected as shown below:

In claim 20, col. 16, line 56 change "claim 14" to --claim 15--.

Signed and Sealed this
Fourth Day of January, 2011

David J. Kappos
*Director of the United States Patent and Trademark Office*